United States Patent
Iland et al.

(10) Patent No.: US 10,036,641 B1
(45) Date of Patent: Jul. 31, 2018

(54) COORDINATING TRAVEL ON A PUBLIC TRANSIT SYSTEM AND A TRAVEL COORDINATION SYSTEM

(71) Applicant: Uber Technologies, Inc., San Francisco, CA (US)

(72) Inventors: Daniel Iland, Oakland, CA (US); Andrew Irish, Mountain View, CA (US); Srinivasan Rajagopal, Mountain View, CA (US)

(73) Assignee: UBER TECHNOLOGIES, INC., San Francisco, CA (US)

(*) Notice: Subject to any disclaimer, the term of this patent is extended or adjusted under 35 U.S.C. 154(b) by 0 days.

(21) Appl. No.: 15/478,245

(22) Filed: Apr. 4, 2017

Related U.S. Application Data

(63) Continuation of application No. 15/477,230, filed on Apr. 3, 2017.

(51) Int. Cl.
*G01C 21/00* (2006.01)
*G01C 21/34* (2006.01)
*H04W 4/02* (2018.01)
*G01C 21/36* (2006.01)
*G06Q 50/30* (2012.01)

(52) U.S. Cl.
CPC ..... *G01C 21/3423* (2013.01); *G01C 21/3415* (2013.01); *G01C 21/3438* (2013.01); *G01C 21/3492* (2013.01); *G01C 21/3676* (2013.01); *G06Q 50/30* (2013.01); *H04W 4/02* (2013.01)

(58) Field of Classification Search
CPC .......... G01C 21/3423; G01C 21/34; G01C 21/3415; G01C 21/3438; G01C 21/3492; G01C 21/3676; G06Q 50/30; H04W 4/02

USPC .......................................................... 701/41
See application file for complete search history.

(56) References Cited

U.S. PATENT DOCUMENTS

| | | | |
|---|---|---|---|
| 4,360,875 A * | 11/1982 | Behnke | G07B 15/00 379/93.02 |
| 7,840,427 B2 | 11/2010 | O'Sullivan | |
| 9,373,259 B2 * | 6/2016 | Maitra | G01C 21/3423 |
| 2004/0088104 A1 * | 5/2004 | Izbicki | G08G 1/123 701/117 |
| 2008/0270204 A1 | 10/2008 | Poykko et al. | |

(Continued)

OTHER PUBLICATIONS

PCT International Search Report and Written Opinion, PCT Application No. PCT/IB2018/050972, dated Jun. 19, 2018, 17 pages.

*Primary Examiner* — Muhammad Shafi
(74) *Attorney, Agent, or Firm* — Fenwick & West LLP

(57) ABSTRACT

A travel coordination system determines a route for a rider using a public transit system and a provider. The travel coordination system may determine a route that describes a public transit stop at which the rider exits the public transit system, and the travel coordination system can route a provider so that the provider transports the rider when the rider arrives at the public transit stop. The travel coordination system may update the rider's route after transmitting the route to the rider. The travel coordination system may determine a public transit vehicle on which the rider is traveling or predict the rider's destination. If multiple riders are traveling on the public transit vehicle and if those riders exit the public transit station using the same public transit stop, the travel coordination system may match those riders together for transport by a provider.

20 Claims, 8 Drawing Sheets

(56) References Cited

U.S. PATENT DOCUMENTS

| | | |
|---|---|---|
| 2015/0228193 A1 | 8/2015 | Bick et al. |
| 2015/0324717 A1 | 11/2015 | Lord et al. |
| 2016/0021154 A1* | 1/2016 | Schoeffler ............. G06Q 10/10 709/204 |
| 2016/0027079 A1* | 1/2016 | Schoeffler .......... G06Q 30/0609 705/325 |
| 2016/0055605 A1 | 2/2016 | Kim et al. |
| 2016/0247095 A1 | 8/2016 | Scicluna et al. |
| 2016/0364678 A1* | 12/2016 | Cao ...................... G06Q 10/083 |

* cited by examiner

US 10,036,641 B1

COORDINATING TRAVEL ON A PUBLIC TRANSIT SYSTEM AND A TRAVEL COORDINATION SYSTEM

CROSS-REFERENCE TO RELATED APPLICATIONS

This application is a continuation of U.S. patent application Ser. No. 15/477,230, entitled "Coordinating Travel on a Public Transit System and a Travel Coordination System" and filed Apr. 3, 2017, the contents of which are incorporated by reference herein in their entirety.

BACKGROUND

Field of Art

The described embodiments relate generally to travel coordination systems.

Description of Art

Travel coordination systems facilitate travel by connecting users of the system who need rides (e.g., "riders") with users of the system who can drive them (e.g., "providers"). A rider can submit a request for a ride to the travel coordination system and the travel coordination system selects a provider to service the request by transporting the rider to his intended destination.

SUMMARY

Described embodiments include a travel coordination system that routes a rider to his destination using a public transit system and a provider. The travel coordination system can determine a current location and a destination of a rider traveling within a public transit system. The public transit system can have one or more public transit lines, where each public transit line includes a plurality of public transit stops. The travel coordination system can identify a public transit line of the one or more public transit lines on which the rider is traveling, and identify a first optimal route from the current location of the rider to the destination of the rider based on routing data. The first route can include a first public transit stop on the identified public transit line through which the rider should exit the public transit system to be picked up by a first provider at a first pickup location near the public transit stop. The travel coordination system can transmit a first notification to a rider client device of the rider. The first notification can comprise the first route and instructions to exit the public transit system at the first public transit stop. The travel coordination system can identify a second optimal route from the current location of the rider to the destination of the rider based on new routing data. The new routing data can be collected by the travel coordination system after transmitting the first notification to the rider client device, and the second route can include a second public transit stop on the identified public transit line through which the rider should exit the public transit system to be picked up by a second provider at a second pickup location near the second public transit stop. The travel coordination system can transmit a second notification to the rider client device of the rider, where the second notification comprises the second route and instructions to exit the public transit system at the second public transit stop. The travel coordination system can transmit routing instructions to a provider client device of the second provider to pick up the rider at the second pickup location.

The travel coordination system can also receive, from a public transit system, public transit data describing one or more public transit vehicles that transport passengers between a plurality of public transit stops. The travel coordination system can receive a first trip request from a first rider client device of a first rider. The first rider may be traveling within the public transit system, and the first trip request can comprise a current location and a destination of the first rider. The travel coordination system can receive a second trip request from a second rider client device of a second rider, the second rider traveling within the public transit system, and the second trip request comprising a current location and a destination of the second rider. The travel coordination system can identify a public transit vehicle on which the first rider and the second rider are traveling based on the current location of the first rider, the current location of the second rider, and the public transit data, where the public transit vehicle is one of the one of more public transit vehicles. The travel coordination system can identify a public transit stop at which the first rider and the second rider will exit the public transit vehicle and match the first rider and the second rider with a provider based on the destination of the first rider and the destination of the second rider. The travel coordination system transmits, to a provider client device of the provider, instructions to pick up the first rider and the second rider at a pickup location near the identified public transit stop and transmits the pickup location to the first rider client device and the second rider client device.

DETAILED DESCRIPTION

Figure 1:
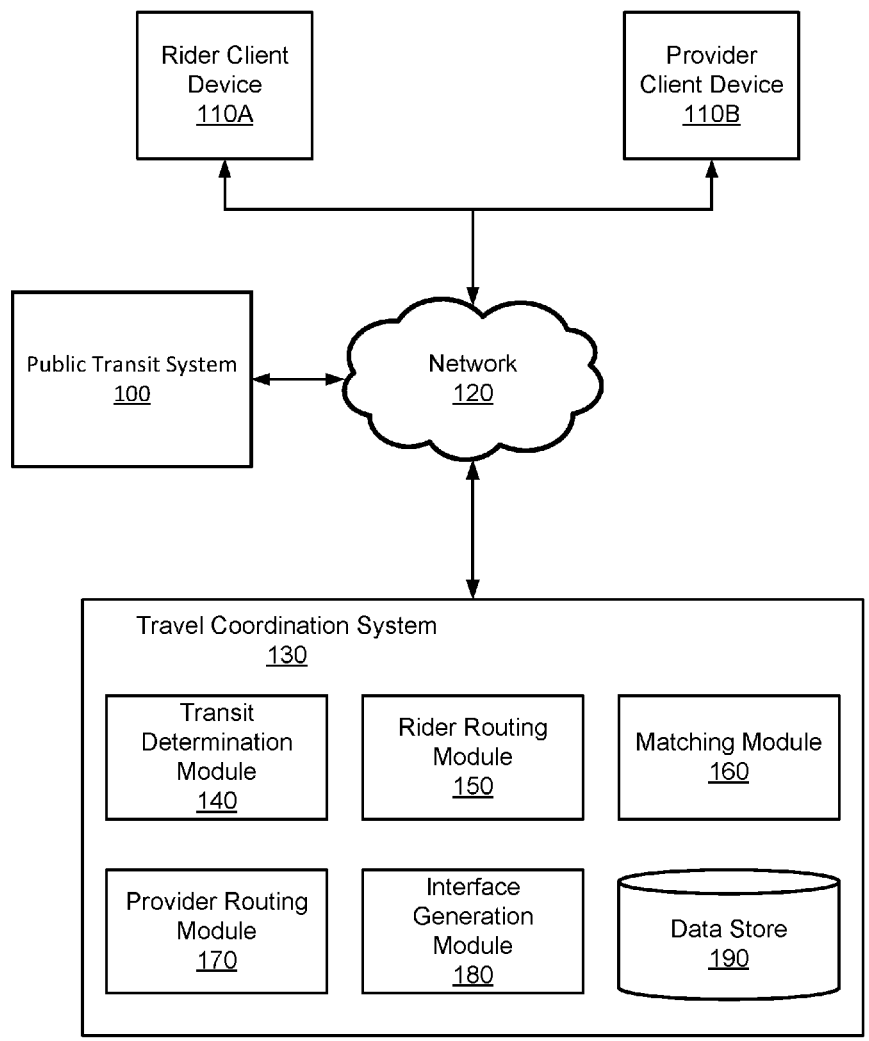
FIG. 1 illustrates an example system environment and system architecture for a travel coordination system, in accordance with some embodiments.

A travel coordination system coordinates travel for a rider using a public transit system and a provider. A rider may use a travel coordination system in conjunction with public transit. For example, a rider may use a public transit system to get to a location near the rider's destination, and then may use the travel coordination system to arrange for transport from the public transit stop to the rider's destination. Conventionally, to be transported from a public transit stop to a destination, the rider must wait to request the trip to the destination until the rider actually arrives at the public transit stop. However, this adds to the wait times of riders because riders must wait for the provider to drive to the public transit stop if the provider is not already there.

For a rider that is traveling via a public transit system, the travel coordination system determines an optimal route from the rider's current location to his destination using the public transit system and a provider. The route may describe a public transit stop at which the rider exits the public transit system, and the travel coordination system can provide routing instructions to a provider so that the provider arrives at a pickup location for the rider at around the time when the rider arrives at the public transit stop via the public transit system. The provider may then provider transportation from the public transit stop to the rider's destination.

The travel coordination system determines an optimal route from the rider's current position to his destination based on routing data, such as data from the public transit system, map data, traffic data, or weather data. The travel coordination system transmits the optimal route to a rider client device for the rider, and may notify the rider of which public transit stop the rider should take. The travel coordination system may update the rider's route after transmitting the route to the rider. If the travel coordination system receives additional routing data after transmitting the initial route, and determines, based on the additional routing data, that a different route is a more optimal route to the rider's destination, the travel coordination system transmits the updated route to the rider. In some embodiments, the travel coordination system prompts the rider to confirm the updated route and, if the travel coordination system receives the confirmation, the travel coordination system transmits routing instructions to a provider to pick up the rider from a pickup location near a public transit stop the rider will use to exit the public transit system when following the updated route.

In some embodiments, the travel coordination system determines, based on user travel data from the rider's client device, a public transit line or public transit vehicle on which the rider is traveling, and may also predict the rider's destination. The user travel data may include location data, acceleration data, or identifiers for wireless networks with which the rider client device has observed or connected to while traveling on the public transit line or public transit vehicle. In some embodiments, the travel coordination system prompts the user to confirm his destination or the public transit line or public transit vehicle on which he is traveling, and if the travel coordination system receives the confirmation from the rider, the travel coordination system automatically arranges for a provider to pick up the rider at the public transit stop at which the rider will exit the public transit system.

If multiple riders are traveling on the same public transit line or public transit vehicle and if those riders plan to exit the public transit station using the same public transit stop, the travel coordination system match those riders together to be transported by the same provider. The travel coordination system matches the riders together with a single provider based on the destinations of the riders. For example, if the riders are traveling to destinations that are close to one another, the riders may be matched together with the same provider. The travel coordination system transmits a pickup location near the public transit stop to the riders that are being picked up by the same provider.

By arranging for a provider to pick up the rider at a public transit stop at around the time the rider arrives at the public transit stop via the public transit system, the travel coordination system can reduce the wait time of the rider when the rider exits the public transit system because the provider may already be en route to or at the pickup location. If the rider indicates that he is willing to be transported with other riders, the travel coordination system further reduces the rider's wait time by matching the rider with other riders who were on the same public transit vehicle. Additionally, by reevaluating the rider's route to his destination and updating the route if a more optimal route is determined, the travel coordination system can further reduce the cost and time of the rider's trip based on new routing data. Furthermore, by predicting a rider's destination or by identifying the public transit line or public transit vehicle on which the rider is traveling, the travel coordination system can make it easier for the rider to receive transportation using the travel coordination system by removing the need to actively submit a trip request to the travel coordination system.

FIG. 1 illustrates an example system environment and architecture for a travel coordination system 130, in accordance with some embodiments. The illustrated system environment includes a public transit system 100, a rider client device 110A, a provider client device 110B, a network 120, and a travel coordination system 130. In alternate embodiments, the functionality of each component may be distributed differently from the examples described herein, and the system environment may include more, fewer, or different components than illustrated in FIG. 1. For example, the system environment may include more than one rider client device 110A or provider client device 110B connected to the travel coordination system 130.

The public transit system 100 is a shared passenger-transport service that is available for use by the general public. The public transit system 100 can include one or more vehicles that are available to provide transportation to users of the public transit system 100. Example vehicles that may be used by the public transit system include buses, trolleys, trams, passenger trains, subways, ferries, and airplanes. The public transit system 100 includes one or more "public transit lines," which are routes traveled by vehicles within the public transit system 100. Each line includes one or more public transit stops, which are nodes on the public transit lines through which users of the public transit system 100 can enter the public transit system (e.g., can board a public transit vehicle), or can exit the public transit system (e.g., can exit a public transit vehicle). Lines in the public transit system may share one or more stops, which allow users who were traveling on one line to transfer to another line of the public transit system 100. In many cities, such as New York City and San Francisco, multiple public transit systems 100 may operate simultaneously within the city or region, and may interconnect at shared stops.

The public transit system 100 can communicate with the travel coordination system 130 to coordinate travel for riders by the travel coordination system 130. The public transit system 100 provides public transit data to the travel coordination system 130, which may include some or all of the locations and routes of public transit lines within the public transit system 100, the locations of public transit stops, the public transit lines with which each public transit stop is associated, the number of public transit vehicles on each public transit line, when each public transit vehicle is expected to arrive at or depart from each public transit stop, the current location of public transit vehicles, the number of users that are on each public transit vehicle, the number of users who enter or exit a public transit line at each public transit stop, whether a public transit line is under construction, whether a public transit vehicle has been delayed, or the cost of using the public transit system. The public transit system 100 may continuously or periodically transmit public transit data to the travel coordination system 130 or may transmit the public transit data in response to a request for the public transit data from the travel coordination system 130.

A user of the travel coordination system 130 can interact with the travel coordination system 130 through a rider client device 110A or through a provider client device 110B. While the rider client device 110A and the provider client device 110B may be described herein as distinct devices, the rider client device 110A may be capable of performing similar or the same functionality as the provider client device 110B, and vice versa. For convenience, the rider client device 110A and the provider client device 110B may be referred to collectively as a "client device 110."

A client device 110 can be a personal or mobile computing device, such as a smartphone, a tablet, a notebook computer, or a desktop computer. In some embodiments, a client device 110 executes a client application that uses an application programming interface (API) to communicate with the travel coordination system 130 through the network 120. The client application can present information received from the travel coordination system 130 on a user interface, such as a map of the geographic region, and the current location of the client device 110.

The client device 110 may be configured to transmit user travel data to the travel coordination system 130. The user travel data may include data collected from various sensors included within the client device 110. For example, the user travel data may include location data about the current location of the client device 110 collected from a location sensor, the acceleration data of the client device 110 collected from an acceleration sensor, or wireless network identifiers of wireless networks to which the client device 110 connected using a wireless network adapter.

Through operation of the rider client device 110A, a rider can make a trip request to the travel coordination system 130. According to an example, a trip request can include user identification information, the number of passengers for the trip, a requested type of the provider (e.g., a vehicle type or service option identifier), the current location and/or the pickup location (e.g., a user-specific location, or a current location of the client device 110A), or the destination for the trip. The current location of the rider client device 110A may be designated by the rider, or detected using a location sensor of the rider client device 110A (e.g., a global positioning system (GPS) receiver).

If a rider is using the public transit system 100, the rider uses the rider client device 110A to submit a trip request to be picked up from a point along a line of the public transit system 100. The trip request may include an identifier for the public transit system 100 that the rider is using, a line or route of the public transit system 100 that the rider is using, or a node or stop on the line that the rider will use to exit the public transit system 100. In some embodiments, the trip request also describes whether the rider wishes to be picked up from a particular public transit stop on a public transit line, or whether the rider wishes for the travel coordination system 130 to determine an optimal route for the rider and to indicate which public transit stop to use to exit the public transit system 100. The rider client device 110A may receive and display routing information from the travel coordination system 130 that describes one or more public transit lines for the rider to take to travel to the rider's destination, and may further describe nodes on the one or more public transit lines for the rider to use to enter and exit the public transit lines.

A provider can use the provider client device 110B to interact with the travel coordination system 130 to identify riders to whom the provider can provide transportation. In some embodiments, the provider is a person operating a vehicle capable of transporting passengers. In some embodiments, the provider is an autonomous vehicle that receives routing instructions from the travel coordination system 130. For convenience, this disclosure generally uses a car with a driver as an example provider. However, the embodiments described herein may be adapted for a provider operating alternative vehicles.

A provider can receive assignment requests through the provider client device 110B. An assignment request identifies a rider who submitted a trip request to the travel coordination system 130 and matches the rider with the provider for a trip. For example, the travel coordination system 130 can receive a trip request from a rider client device 110A of a rider, select a provider from a pool of available (or "open") users to provide the trip, and transmit an assignment request to the selected provider's client device 110B. In some embodiments, a provider can indicate availability for receiving assignment requests. This availability may also be referred to herein as being "online" (available to receive assignment requests) or "offline" (unavailable to receive assignment requests). For example, a provider can decide to start receiving assignment requests by going online (e.g., by launching a client application or providing input on the client application to indicate that the provider wants to receive invitations), and stop receiving assignment requests by going offline. In some embodiments, when a provider client device 110B receives an assignment request, the provider has the option of accepting or rejecting the assignment request. By accepting the assignment request, the provider is assigned to the rider, and is provided the rider's trip details, such as pickup location and trip destination location. In one example, the rider's trip details are provided to the provider client device 110B as part of the invitation or assignment request.

In some embodiments, the travel coordination system 130 provides routing instructions to a provider through the provider client device 110B when the provider accepts an assignment request. The routing instructions can direct a provider from his current location to a pickup location for the rider, or can direct a provider to the rider's destination. The provider client device 110B can present the routing instructions to the provider in step-by-step instructions or can present the entire route at once.

The rider client device 110A, provider client device 110B, and public transit system 100 can communicate with the travel coordination system 130 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

FIG. 1 further illustrates an example system architecture for the travel coordination system 130, in accordance with some embodiments. The travel coordination system 130 can coordinate a rider's trip to his destination using both the public transit system and a provider. The travel coordination system 130 may include a transit determination module 140, a rider routing module 150, a matching module 160, a provider routing module 170, an interface generation module 180, and a data store 190. Alternate embodiments may include more, fewer, or different modules from those illustrated in FIG. 1, and the functionality of the modules may be distributed differently from the description herein.

The transit determination module 140 collects and determines trip information about a rider traveling within the public transit system to be used to route the rider to his destination. Trip information contains information about a rider that is used by the travel coordination system 130 to route the rider from his current location to his destination when the rider is traveling within the public transit system 100. For example, the trip information may include the rider's current location, the rider's destination, the public transit line or public transit vehicle on which the rider is traveling, or the public transit stop at which the rider will exit the public transit system 100. The transit determination module 140 may obtain trip information as part of trip requests received from the rider's client device 110A. The trip requests can include the rider's current location, the rider's destination, the public transit line or public transit vehicle on which the rider is traveling, or the public transit stop at which the rider will exit the public transit system 100. The transit determination module 140 may extract the trip information from a trip request and provide the information to other modules in the travel coordination system 130 in order to provide transportation to the rider from the specified public transit stop on the public transit line to his destination.

A rider may also allow the transit determination module 140 to determine trip information based on user travel data from the rider client device 110A without receiving a trip request from the rider. For example, the transit determination module 140 can identify the public transit line or public transit vehicle within the public transit system 100 on which the rider is traveling. In some embodiments, the transit determination module 140 identifies where on a public transit vehicle the rider is located. For example, if the public transit vehicle is a train or subway, the transit determination module 140 can identify the train car or subway car on which the rider is traveling.

To identify how the rider is traveling through the public transit system 100, the transit determination module 140 may use travel data fingerprints associated with public transit lines, public transit stops, or public transit vehicles. The travel data fingerprints can describe features of user travel data that identify portions of the public transit system 100, and may be compared with a user's travel data to identify how a rider is traveling through the public transit system 100. For example, a travel data fingerprint may describe features of acceleration data that would represent the acceleration a rider would experience on a particular segment of a particular public transit line. The travel data fingerprints may be machine learned based on user travel data from many riders in the travel coordination system 130 or pre-determined by developers of the travel coordination system 130. In some embodiments, the travel data fingerprints are generated based on public transit data received from the public transit system. For example, the public transit data may include geographic location data for public transit stops, public transit lines, and public transit vehicles, arrival and departure times for each public transit stop, and transit times for segments of public transit lines, which may be used to generate the travel data fingerprints. In some embodiments, the transit determination module 140 identifies how a rider is traveling within the public transit system 100 based on location data, acceleration data, or identifiers for wireless networks observed by the rider's client device 110A. For example, the transit determination module 140 may determine which public transit line or public transit vehicle the rider is on based on whether the location of the rider's client device 110A is near the location of a public transit vehicle traveling along the public transit line, or whether the rider's path of travel is similar to the route taken by a public transit vehicle on a public transit line. In some embodiments, the transit determination module 140 uses the location data to determine whether the rider is waiting at a public transit stop to determine how the rider is traveling via the public transit system 100. The transit determination module 140 also may identify features of the acceleration data (e.g., the timing, magnitude, and direction of accelerations experienced by the rider), and compare those features to the features described by the travel data fingerprints. In some embodiments, the transit determination module 140 generates a transit fingerprint for particular user's travel data and compares the user's transit fingerprint to a transit fingerprint of another user to determine whether the users are riding on the same public transit line or public transit vehicle.

The transit determination module 140 may also determine trip information by predicting the destination of the rider traveling within the public transit system 100. In some embodiments, the transit determination module 140 predicts the rider's destination based on the current location of the rider, a public transit stop through which the rider entered the public transit system, or historical user travel data of the rider. The transit determination module 140 also may use a rider's historical trip data describing trips the rider has taken with the travel coordination system. For example, if a rider typically uses a provider to travel from a public transit stop to his place of work and the transit determination module 140 detects that the rider is traveling in the public transit system 100 towards the public transit stop, the transit determination module 140 may predict that the rider's destination is his place of work. In some embodiments, the transit determination module 140 also determines a confidence score that represents the likelihood that the rider's actual destination is the predicted destination. If the confidence score for the predicted destination exceeds a confidence threshold, the transit determination module 140 may prompt the rider to confirm his destination. For example, the confidence threshold may require confidence score of 80% certainty of the rider's destination for the rider to be prompted to confirm his destination. If the confidence score fails to meet the confidence threshold, the rider is not prompted with a predicted destination. If the rider confirms the predicted destination, the transit determination module 140 may instruct the rider routing module 150 to provide the rider with a route to his destination.

The rider routing module 150 determines an optimal route for the rider to take to the rider's destination using the public transit system 100 and a provider. The rider routing module 150 can determine a route for a rider to his destination by using a combination of transportation from a rider and the public transit system 100 if the rider is already using the public transit system 100. For example, if a rider is riding on a subway, the rider routing module 150 may suggest a stop on the subway at which the rider should get off of the subway to be picked up by a provider. The rider routing module 150 can use routing data to identify an optimal route for a rider. Routing data can include user travel data, public transit data, user profile data, map data, provider supply data, trip demand data, traffic data, or weather data. The rider routing module 150 may receive routing data from a rider client device 110A, a provider client device 110B, the public transit system 100, or a third party system.

To determine the optimal route for a rider, the rider routing module 150 may generate a set of candidate routes from the rider's current position to the rider's destination. The candidate routes include a public transit stop at which the rider exits the public transit system 100 or transfers from one public transit line to another. In some embodiments, the set of candidate routes includes routes that involve the rider using different upcoming public transit stops to exit the public transit system 100. For example, the set of candidate routes may include routes that use the next five public transit stops on the public transit line on which the rider is traveling. The rider routing module 150 may determine routing features of each route of the set of candidate routes based on routing data. Example routing features include the time it would take for the user to reach his destination using the candidate route, the estimated cost of traveling within the public transit system 100 along the candidate route, the estimated cost of traveling using the travel coordination system 130 along the candidate route, and the total cost of traveling along the route. The rider routing module 150 generates a score for each candidate route to determine the optimal route based on the routing features of the route. The scoring function may be pre-determined by a developer of the travel coordination system 130 or may be generated using a machine-learning algorithm. In some embodiments, the scoring function uses weights for features of the route to generate a score for a candidate route based on priorities of the travel coordination system 130 or the rider. For example, if reducing total trip cost is a priority and if traveling on the public transit system 100 is less expensive than traveling with a provider, the total cost of the trip may be weighted more highly and thus candidate routes with greater portions being on the public transit system 100 may be scored more highly than candidate routes that include more traveling with a provider within the travel coordination system 130. Other possible priorities for the rider and the travel coordination system 130 include reducing travel time, reducing environmental impact, increasing the proportion of providers that are providing rides to riders, reducing wait time for riders, minimizing provider time spent stationary near transit stations, or maximizing the number of riders being transported by a provider. The rider routing module 150 selects a candidate route based on the generated scores and provides routing instructions to a rider based on the selected route. The rider routing module 150 may select the candidate route with the highest score or the lowest score, depending on how the scores are calculated. In some embodiments, the rider routing module 150 ranks the candidate routes based on the scores, and selects a candidate route based on the ranking. The rider routing module 150 may transmit the routing instructions to the rider client device 110A to be displayed to the rider. In some embodiments, the rider routing module 150 notifies the rider, through the rider client device 110A, of a public transit stop to use to exit the public transit system 100. The rider routing module 150 may notify the rider of the public transit stop to use when the routing instructions are sent to the rider client device 110A or when the public transit vehicle on which the rider is traveling is getting close to the public transit stop. The rider routing module 150 notifies the provider routing module 160 of the public transit stop through which the rider will be exiting the public transit system 100, and instructs the provider routing module 160 to route a provider to pick up the rider at a pickup location near or within the public transit stop and at a pickup time near when the rider will be arriving at the public transit stop.

In some embodiments, the rider routing module 150 monitors the rider's travel through the public transit system 100 using an initial route and may reevaluate whether another route is more optimal than the initial one. To determine whether another route is more optimal, the rider routing module 150 generates new scores for candidate routes. The rider routing module 150 may regenerate scores for the original set of candidate routes and select a new route based on the regenerated scores, or may generate a new set of candidate routes and generate scores for the new set. In some embodiments, the rider routing module 150 generates the new scores based on new routing data that is received by the rider routing module 150 after transmitting the initial route to the rider. For example, the rider routing module 150 may generate new scores for candidate routes based on new traffic data or provider supply data receive after the initial route is transmitted to the rider. The rider routing module 150 can select a new route based on the newly generated scores and, if the route is different from the route initially provided to the rider, the rider routing module 150 may transmit the new route to the rider. If the new route requires that the rider exit the public transit system 100 at a different public transit stop, the rider routing module 150 may notify the provider routing module 160 that a provider is no longer needed at the initial public transit stop and that a provider should be routed to pick up the rider at the new public transit stop. In some embodiments, the rider routing module 150 only updates the pickup location to the new route upon receiving confirmation from the rider. The rider routing module 150 may receive the confirmation from the rider in the form of a trip request from the rider's client device 110A.

In some embodiments, the rider routing module 150 provides routing instructions for a rider to reach a pickup location near a public transit stop. The routing instructions display where the pickup location is and may include a route through the public transit stop to the pickup location. The rider routing module 150 may determine the routing instructions based on public transit data describing the public transit stop, the rider's current location, or the provider's current location.

The matching module 160 selects providers to service the trip requests of riders. The matching module 160 receives a trip request from a rider and determines a set of candidate providers that are online, open (e.g., are available to transport a rider), and near the requested pickup location for the rider. In some embodiments, the set of candidate providers include providers that are expected to be near the pickup location of the rider at the time the rider is predicted to be there. For example, if a provider is going to drop off a first rider near the pickup location of a second rider, and drop off the first rider at around the time when the second rider will arrive at his pickup location, the provider may be included in the set of candidate riders. The matching module 160 selects a provider from the set of candidate providers to which it transmits an assignment request. The provider can be selected based on the provider's location, the rider's pickup location, the time at which the rider and the provider are expected to arrive at the rider's pickup location, the type of the provider, the amount of time the provider has been waiting for an assignment request and/or the destination of the trip, among other factors. In some embodiments, the matching module 160 selects the provider who is closest to the pickup location, would take the least amount of time to travel to the pickup location, or would arrive at the pickup location most near a time when the rider will be ready to be picked up. The matching module 160 sends an assignment request to the selected provider. If the provider accepts the assignment request, then the matching module 160 assigns the provider to the rider. If the provider rejects the assignment request, then the matching module 160 selects a new provider and sends an assignment request to the provider client device 110B for that provider.

In some embodiments, the matching module 160 matches multiple riders together to be transported by a provider. The matching module 160 may select an open provider to pick up all of the riders at a single pickup location or may select a provider who is currently transporting a rider, but has room to pick up another rider. The riders that are selected to be transported by the provider may be selected based on the pickup locations of the riders, the distance between the pickup locations, the distance between the riders' destinations, the pickup times of the riders, and the proximity of a first rider's pickup location to the provider's route to a second rider's location.

In some embodiments, the matching module 160 matches riders together with a provider based on whether the riders are traveling together on a public transit vehicle and are exiting the public transit vehicle at the same stop. For example, if the riders are on the same train and are both getting off at the same train station, the matching module 160 may match those riders together with the same provider. The matching module 160 may match riders traveling on the same public transit vehicle based on the number of riders on the public transit vehicle, the number of riders the provider can transport at once, and the destinations of the riders. For example, if eight riders are exiting a public transit vehicle at the same stop and providers can only transport four riders at once, the matching module 160 may match four of the riders to each provider based on the proximity of the riders' destinations to each other. In some embodiments, the matching module 160 matches riders together if the riders are traveling on the same portion of the public transit vehicle (e.g., the same train or subway car).

The provider routing module 170 provides routing instructions to a provider's client device 110B to travel to a rider's pickup location or destination. The provider routing module 170 may determine a route for a provider by generating a set of candidate routes from the current location of the provider's client device 110B to the rider's pickup location or destination, and may select the best candidate route based on based on map data, traffic data, weather data, accident data, or construction data. The provider routing module 170 can route a provider to a pickup location within or near a public transit stop to pick up one or more riders exiting a public transit system 100 at the public transit stop. The provider routing module 170 may route a provider to be at the pickup location such that the provider arrives at the pickup location at approximately the time when the riders have exited the public transit system 100 and be ready for pickup. The provider routing module 170 may transmit the routing instructions to the provider client device 110B to be displayed to the provider.

The interface generation module 180 provides a frontend interface to the client device 100 to communicate with the travel coordination system 130 through the network 120. The interface generation module 180 may provide application programming interface (API) functionality to send data directly to native client device operating systems. The interface generation module 180 may receive and route messages between the travel coordination system 130 and the rider client device 110A and the provider client device 110B. Additionally, the interface generation module 180 can serve web pages, as well as other web-related content.

The interface generation module 180 can provide a user interface to the rider for submitting a trip request through the rider client device 110A. The interface generation module 180 can instruct the rider client device 110A to display a user interface that enables the rider to specify a pick-up location and a destination. In addition, the interface generation module 180 may also provide the rider with geographic information for the area around the rider and an interface through which the rider can provide payment information. The interface generation module 180 can also provide a user interface to a provider through the client device 100. The interface generation module 130 can send assignment requests to the provider client device 110B on behalf of the matching module 170 and may receive responses to the assignment requests from the provider client device 110B. The interface generation module 180 may also provide an interface, via the provider client application, on which the provider's geographic location is displayed, and provide routing instructions to the provider when the provider is traveling to pick up a rider or transporting a rider to his destination.

The interface generation module 180 can provide the rider client device 110A with a user interface that displays the rider's route. The interface generation module 180 may provide a notification through the rider client device 110A when the route has been determined or if the route has changed. The interface generation module 180 may provide an interface with a notification that allows the rider to accept the route. Additionally, the interface generation module 180 may provide a notification to the rider client device 110A if the rider routing module 150 predicts a rider's destination and suggests a pickup from a provider. The interface generation module 180 may provide an interface with the notification that allows the rider to confirm the predicted destination and allow the travel coordination system 130 to assign a provider to pick up the rider when the rider exits the public transit system 100.

The data store 190 stores data for the travel coordination system 130. For example, the data store may store user profile data, which can include a user's name, address, whether the user is a rider or a provider, a vehicle associated with the user, or the rate at which the user uses the travel coordination system 130. The data store 190 can also store user travel data, such as historical location data of a rider's client device 110A or a provider's client device 110B and acceleration data of a rider client device 110A or a provider client device 110B. The data store 190 may also store map data, which can include street names, street locations, street speed limits, street directionality, intersection locations, or intersection rules (e.g., turn restrictions). The data store 190 may also store provider supply data and trip demand data, which, respectively, describe the supply of providers available to provide transportation to riders and the demand from riders for trips from providers. The data store 190 may also store information about trips taken using the travel coordination system 130, such as the start and end locations of trips, the start and end times of trips, identification information of the rider and provider associated with a trip, the distance and duration of a trip, the route taken on the trip, or the price of the trip. The data store 190 may also store data generated by the travel coordination system 130, such as models for provider supply and trip demand. The data store 190 may categorize data based on a particular geographic region, a rider, or a provider with which the data is related.

The data store 190 also stores data about the public transit system 100 to be used by the travel coordination system 130. For example, the data store 190 may store data about public transit lines, public transit stops, public transit vehicles, the transit times between public transit stops on a public transit line, the number of passengers that can be transported by a public transit vehicle, and the number of passengers that enter or exit the public transit system 100 through each public transit stop. In some embodiments, the data store 190 stores a model of the public transit lines and public transit stops of a public transit system 100. The model may include a directed graph where nodes are public transit stops and an edge from one node to another signifies that a public transit vehicle provides transportation from the first node to the second node. The model may store additional data associated with each node or edge of the graph. For example, data associated with a node associated with a public transit stop might describe the geographic location of the public transit stop, the name of the public transit stop, the number of passengers that enter or exit the public transit system 100 at that public transit stop, times when public transit vehicles arrive at and depart from the public transit stop, and the public transit lines that use the public transit stop. Additionally, data associated with an edge may describe an estimate for the time to travel from one public transit stop to another, the route from one public transit stop to another, and the times when a public transit vehicle transports passengers from one public transit stop to another. The nodes and edges may be associated with fingerprints that identify user travel data that corresponds to public transit lines and public transit stops. For example, the nodes and edges may be associated with data that describes accelerometer data, location data, or wireless network identifiers that identify the public transit line segment or public transit stop that corresponds with the node or edge.

FIGS. 2 through 6 illustrate example user interfaces to be presented on a rider client device, in accordance with some embodiments. The illustrated user interfaces allow a travel coordination system to transport a rider to his destination in conjunction with a public transit system.

Figure 2:
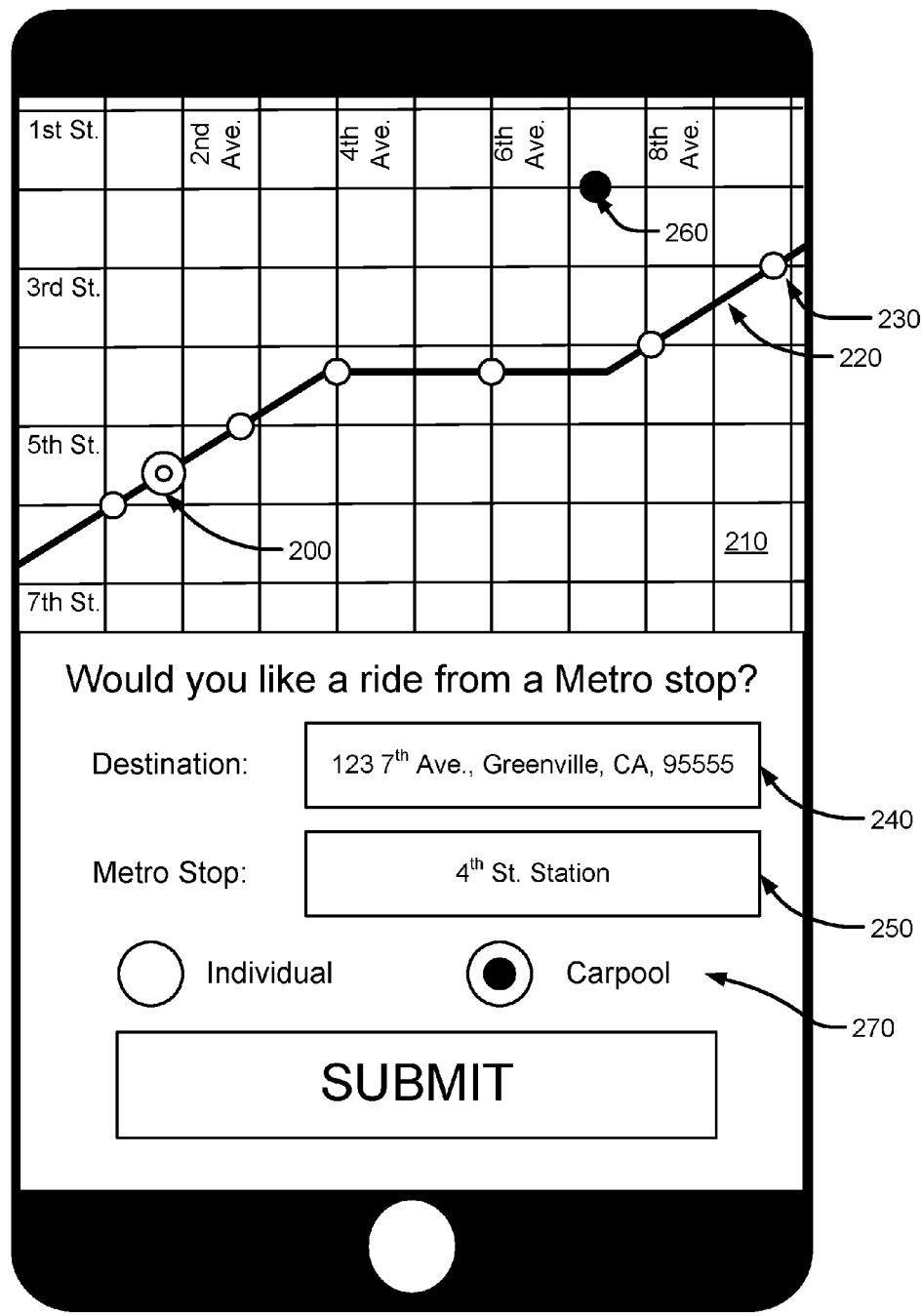
FIG. 2 illustrates an example user interface wherein a rider can request to be transported to a destination using a public transit system and a travel coordination system, in accordance with some embodiments.

FIG. 2 illustrates an example user interface wherein a rider can request to be transported to a destination using a public transit system and a travel coordination system, in accordance with some embodiments. The user interface displays the rider's location 200 on a map 210 of a geographic area around the rider. The user interface also displays a public transit line 220 on the map 210, as well as public transit stops 230 on the public transit line 220. The user interface allows a rider to input his destination 240 and a public transit stop 250 at which the rider will exit the public transit system. In some embodiments, the user interface displays the rider's destination 260 on the map of the geographic area. The user interface also provides options 270 that allow the rider to choose between his own provider or sharing a provider with other riders for when the rider is picked up from the public transit stop and transported to his destination.

Figure 3:
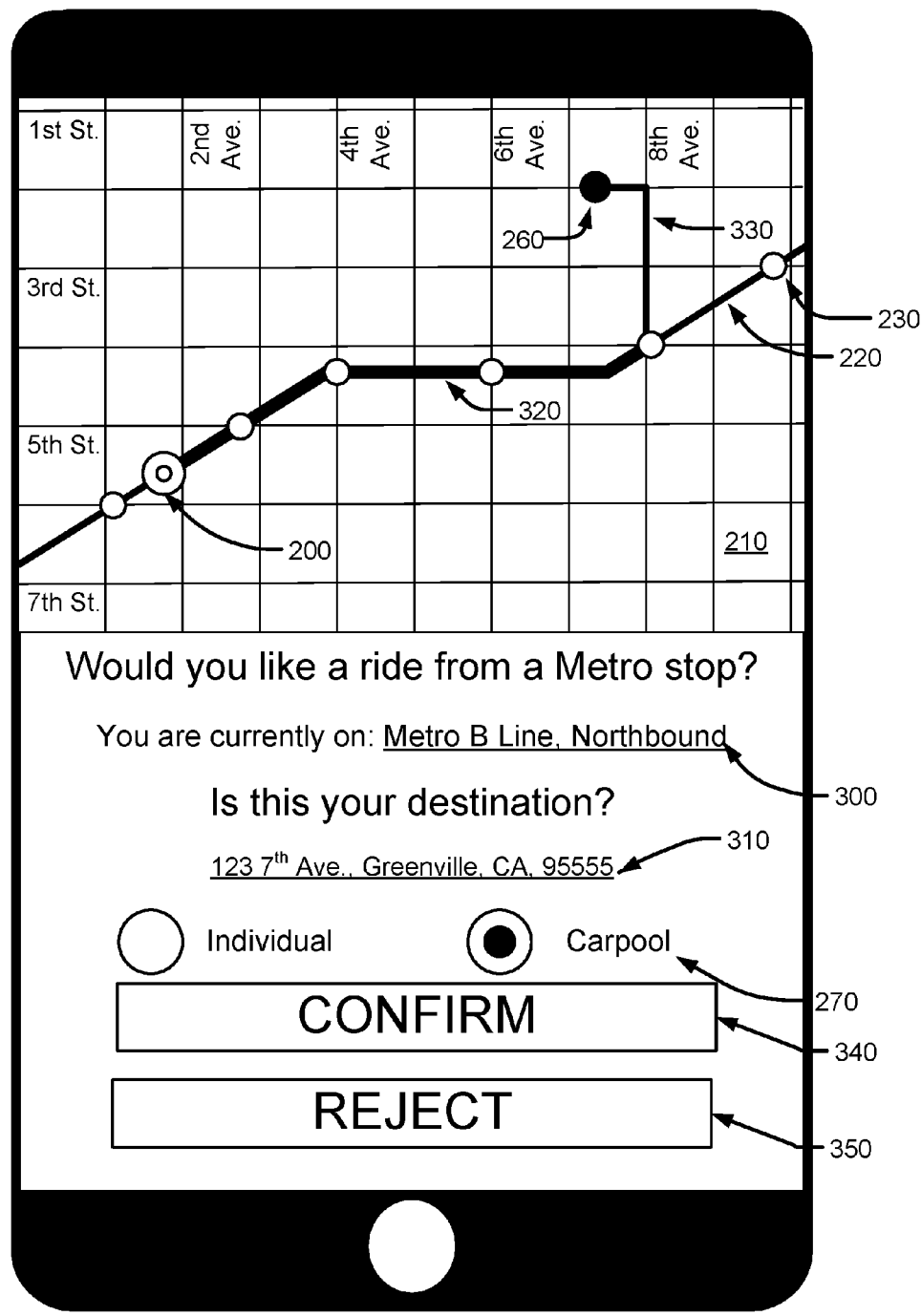
FIG. 3 illustrates an example user interface wherein a travel coordination system detects whether a rider is traveling on a public transit line and offers transportation via a provider from a public transit stop to the rider's destination, in accordance with some embodiments.

FIG. 3 illustrates an example user interface wherein a travel coordination system detects whether a rider is traveling on a public transit line and offers transportation via a provider from a public transit stop to the rider's destination, in accordance with some embodiments. The travel coordination system may detect on which public transit line 300 the rider is traveling, and can display the public transit line on the user interface. The user interface also presents a prediction for the rider's destination 310, based on the rider's historical travel data and the rider's current travel. The user interface can also display a route the rider can take from his current position to his destination, where the displayed route shows the path 320 to be taken using the public transit system and the path 330 to be taken by a provider. The user interface prompts the rider to select an option 340 to confirm the displayed route from his current location to his destination. The rider client device notifies the travel coordination system if the rider confirms the displayed route. The user interface also provides an option 350 to the rider to reject the predicted destination if the prediction is incorrect or if the rider does not want to be routed to his destination. If the rider rejects the predicted destination, the user interface may prompt the rider to enter his actual destination.

Figure 4:
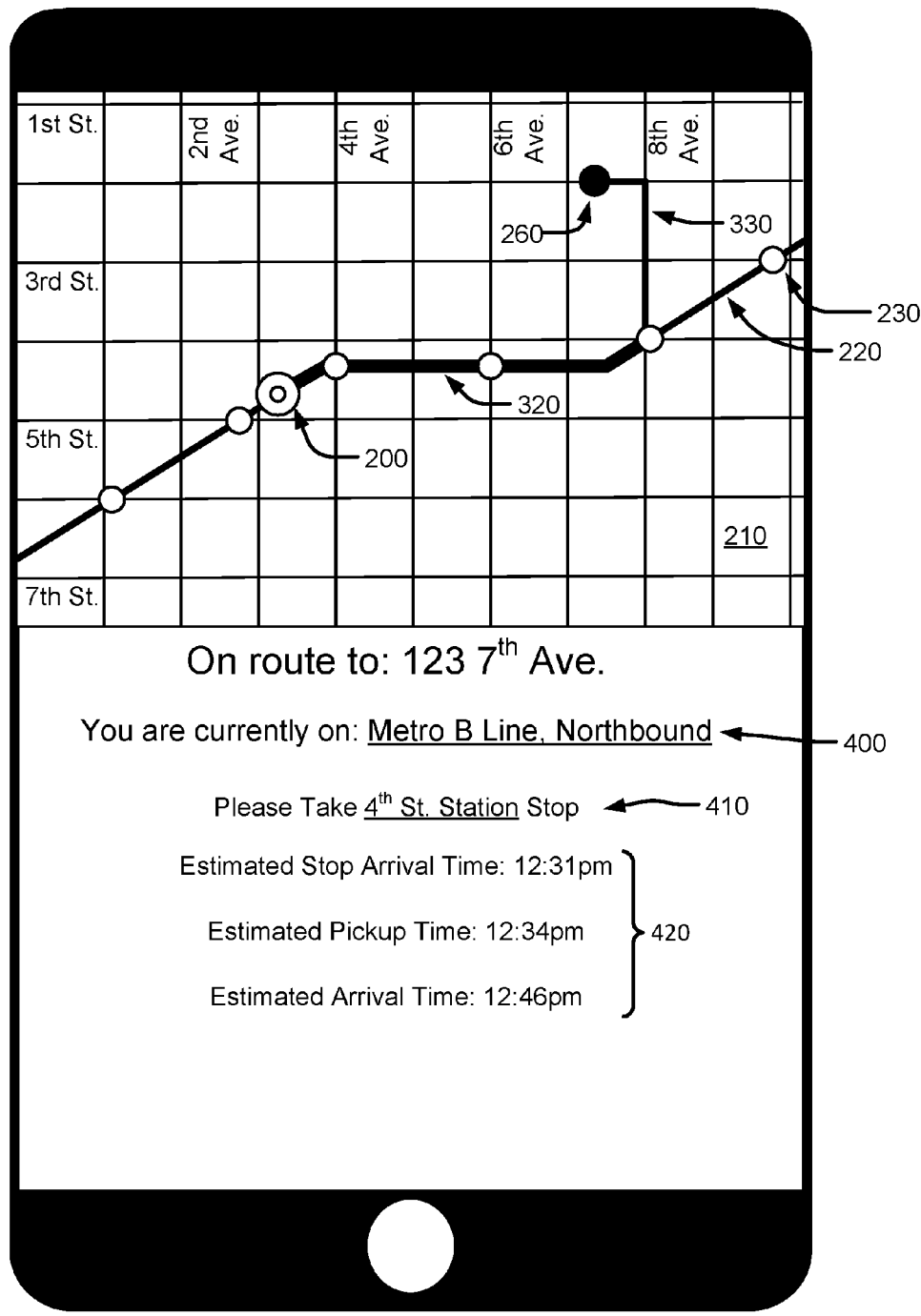
FIG. 4 illustrates an example user interface that displays routing instructions to a rider while the rider is traveling along a public transit line, in accordance with some embodiments.

FIG. 4 illustrates an example user interface that displays routing instructions to a rider while the rider is traveling along a public transit line, in accordance with some embodiments. The user interface displays the route the rider is taking as well as the rider's progress along the route. The user interface also displays information to the rider, such as the public transit line 400 on which the rider is currently traveling, the public transit stop 410 through which the rider will exit the public transit line, and timing estimates 420 for different events along the route, such as the time at which the rider will arrive at the public transit stop through which the rider will exit the public transit line, the time at which the rider will be picked up from the pickup location, and the time at which the rider will arrive at his destination.

Figure 5:
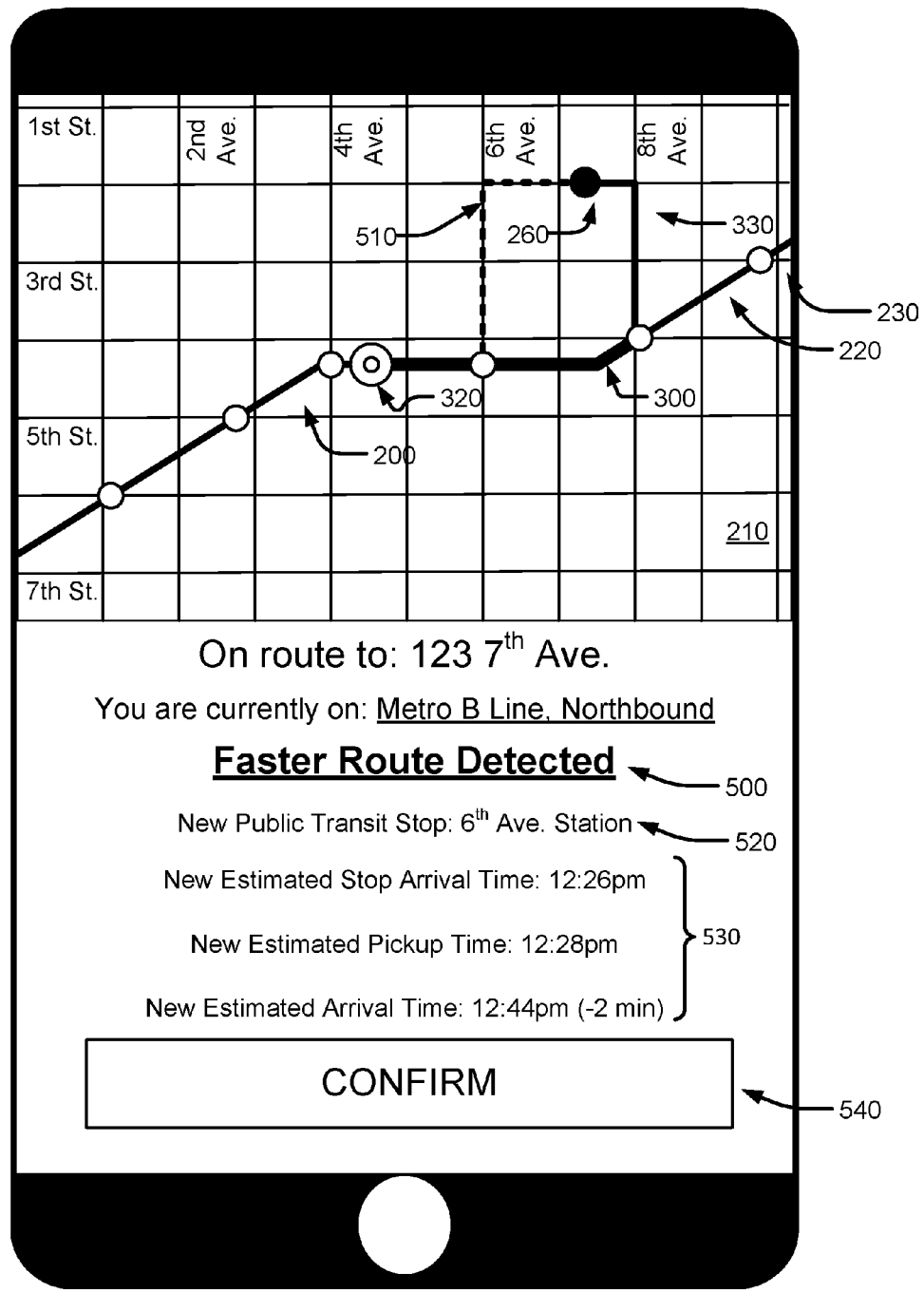
FIG. 5 illustrates an example user interface that displays an updated route from the rider's current location to the rider's destination, in accordance with some embodiments.

FIG. 5 illustrates an example user interface that displays an updated route from the rider's current location to the rider's destination, in accordance with some embodiments. The user interface displays a notification 500 that an updated route has been determined by the travel coordination system. The user interface displays the updated route 510 to the destination, and designates the new public transit stop 520 at which the rider would have to exit the public transit in taking the updated route. The user interface also displays updated timing estimates 530 based on the updated route. If the user would like to travel along the updated route to his destination, the user can select an option 540 to confirm the updated route.

Figure 6:
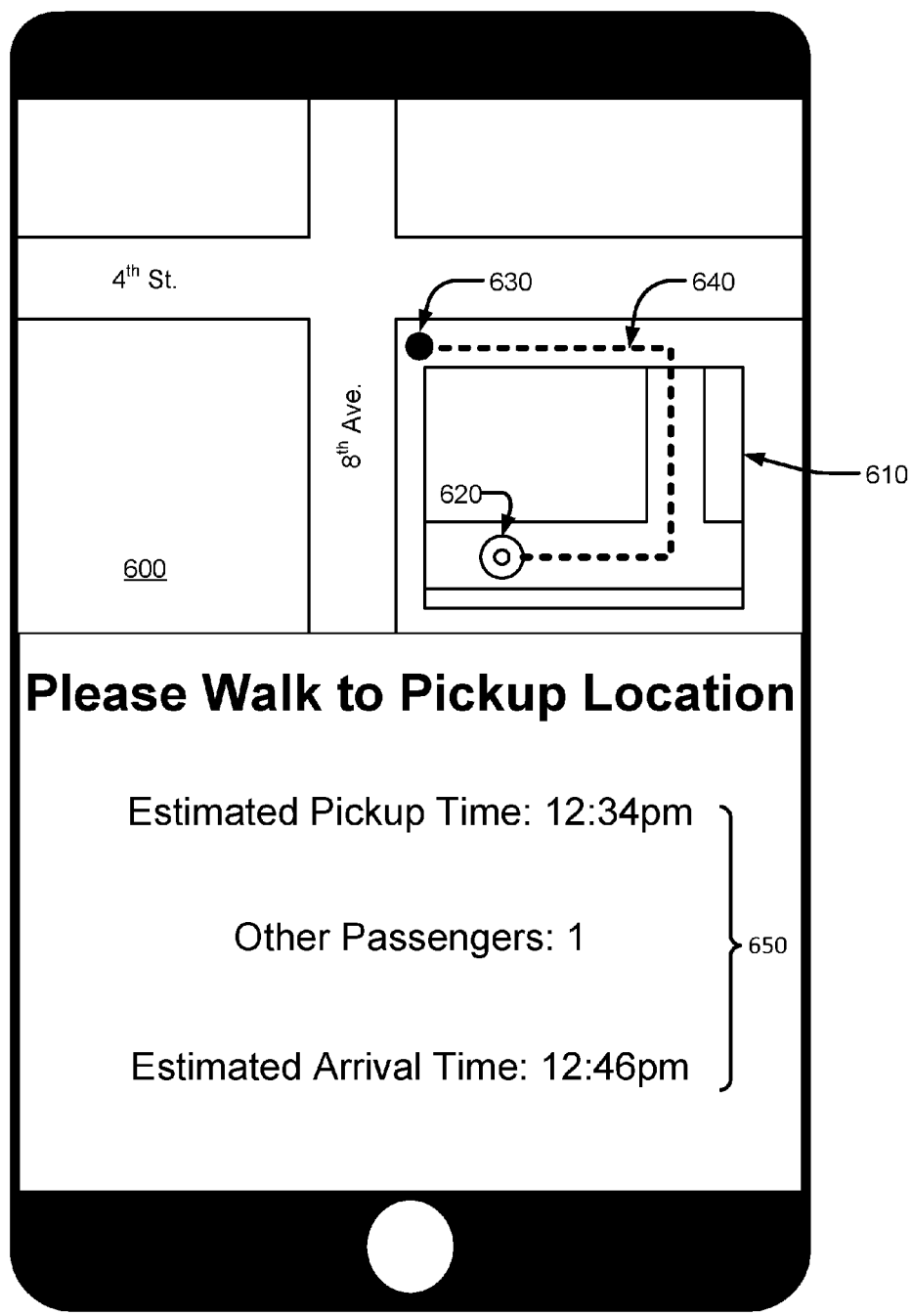
FIG. 6 illustrates an example user interface displaying a route to a rider's pickup location near a public transit stop, in accordance with some embodiments.

FIG. 6 illustrates an example user interface displaying a route to a rider's pickup location near a public transit stop, in accordance with some embodiments. The user interface displays the route to the rider's pickup location near the public transit stop when the rider arrives at the public transit stop and exits the public transit vehicle on which he was traveling. The user interface displays a map 600 of the area around and within the public transit stop 610, as well as the rider's location 620 and the pickup location 630 where the provider will pick up the rider. The user interface displays a route 640 for the rider to travel from his current location to the pickup location, and displays information 650 about the ride from the public transit stop to the rider's destination, such as the estimated pickup time, the number of other passengers the provider will be transporting, and the estimated time that the rider will arrive at his destination. In some embodiments, if the rider is transferring to another public transit line, the user interface displays a route to a location within the public transit stop where the rider can enter the new public transit line.

Figure 7:
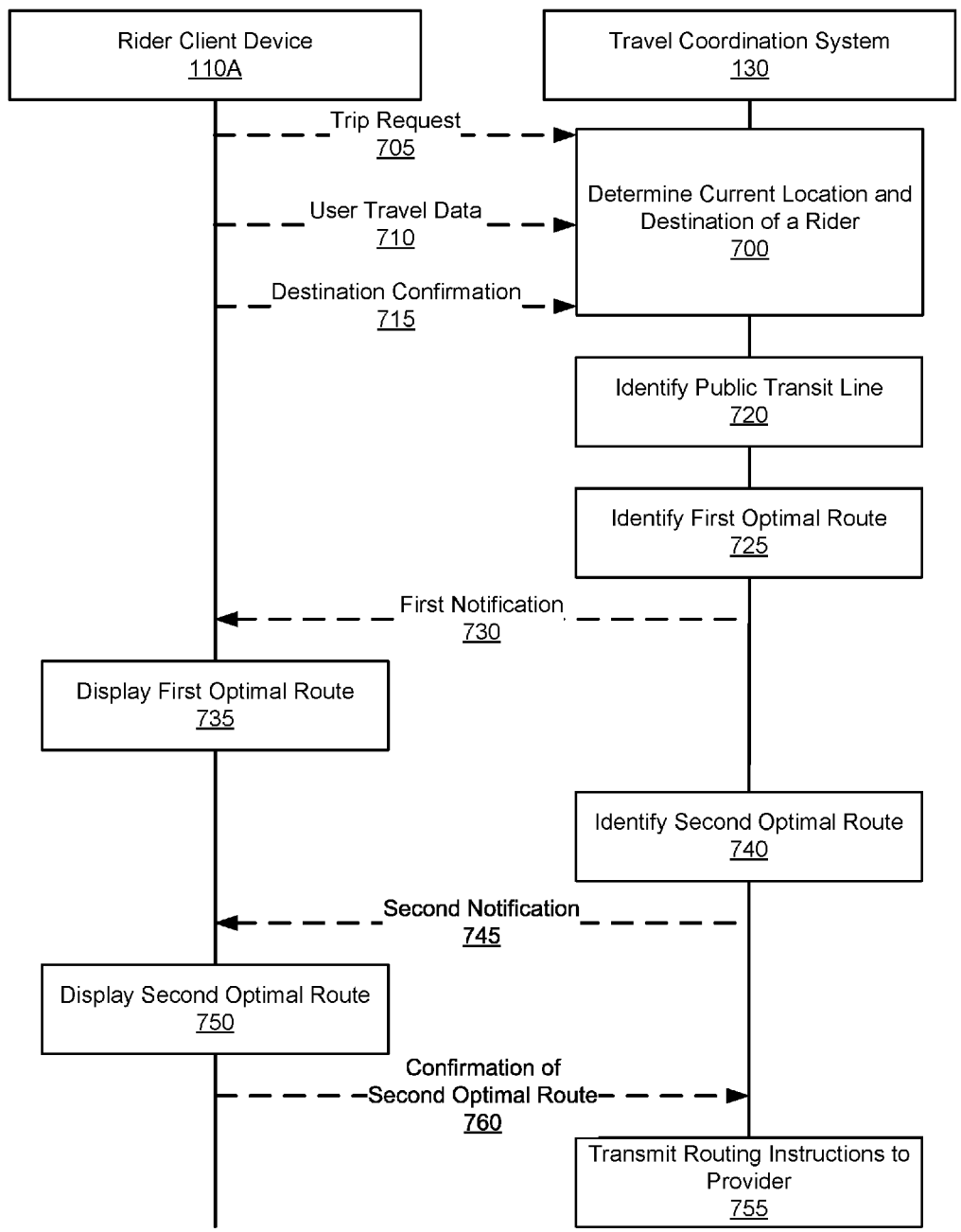
FIG. 7 illustrates a sequence diagram of a method for routing a rider to his transportation using a public transit system and a provider, in accordance with some embodiments.

FIG. 7 illustrates a sequence diagram of a method for routing a rider to his transportation using a public transit system and a provider, in accordance with some embodiments. Alternate embodiments may include more, fewer, or different steps from those described below, and the steps may be performed in a different order than the order illustrated in FIG. 7. Furthermore, the steps herein may be performed automatically and without human interaction with the travel coordination system.

The travel coordination system determines 700 a current location and a destination of a rider, as described above. The travel coordination system can determine the current location and destination based on a trip request 705 received from the rider's client device that includes the rider's current location and destination. The travel coordination system can also determine the current location and destination of the rider by predicting the rider's current location and destination based on user travel data 710 and receiving a confirmation 715 of the rider's current location and destination from the rider's client device. The travel coordination system identifies 720 a public transit line on which the rider is traveling. The travel coordination system can similarly identify the public transit line based on a trip request received from the rider or based on a confirmation of a prediction made by the travel coordination system.

The travel coordination system identifies 725 an optimal route from the rider's current location to his destination. The travel coordination system can identify the optimal route based on routing data, which can include user travel data, public transit data, map data, or traffic data. To identify the optimal route, the travel coordination system may generate a set of candidate routes and generate scores for each of those candidate routes. The travel coordination system may identify the optimal route based on the scores of the candidate routes, e.g., by selecting the candidate route with the highest score. The optimal route includes a public transit stop through which the rider exits the public transit system when following the optimal route. The travel coordination system transmits a notification 730 to the rider's client device that comprises the route and instructions to exit the public transit system at the public transit stop associated with the public transit stop. The rider client device displays 735 the optimal route and routing instructions to the rider through a user interface, as described above. In some embodiments, the travel coordination system provides instructions to a provider to pick up the rider at the public transit stop when the rider is estimated to arrive at the public transit stop.

The travel coordination system may monitor the rider's travel along the first route, and may receive additional routing data from the rider's client device, a provider client device, the public transit system, or third party systems. The travel coordination system identifies 740 a new optimal route based on the new routing data. For example, the travel coordination system may regenerate the scores for the set of candidate routes and, if a new route has a higher score than the first route, the travel coordination system may identify the new route as a new optimal route to provide to the rider. The new route includes a new public transit stop through which the rider exits the public transit system when following the new optimal route.

The travel coordination system transmits a new notification 745 to the rider that includes the new optimal route and instructions to exit the public transit system at the new public transit stop. The rider client device displays 750 the new optimal route and routing instructions through a user interface, as described above. The travel coordination system transmits 755 routing instructions to a provider client device of a provider to pick up the rider at a pickup location near the new public transit stop. In some embodiments, the travel coordination system transmits the routing instructions to the provider client device if the travel coordination system receives confirmation 760 that the rider would like to travel on the new optimal route instead of the initial optimal route.

Figure 8:
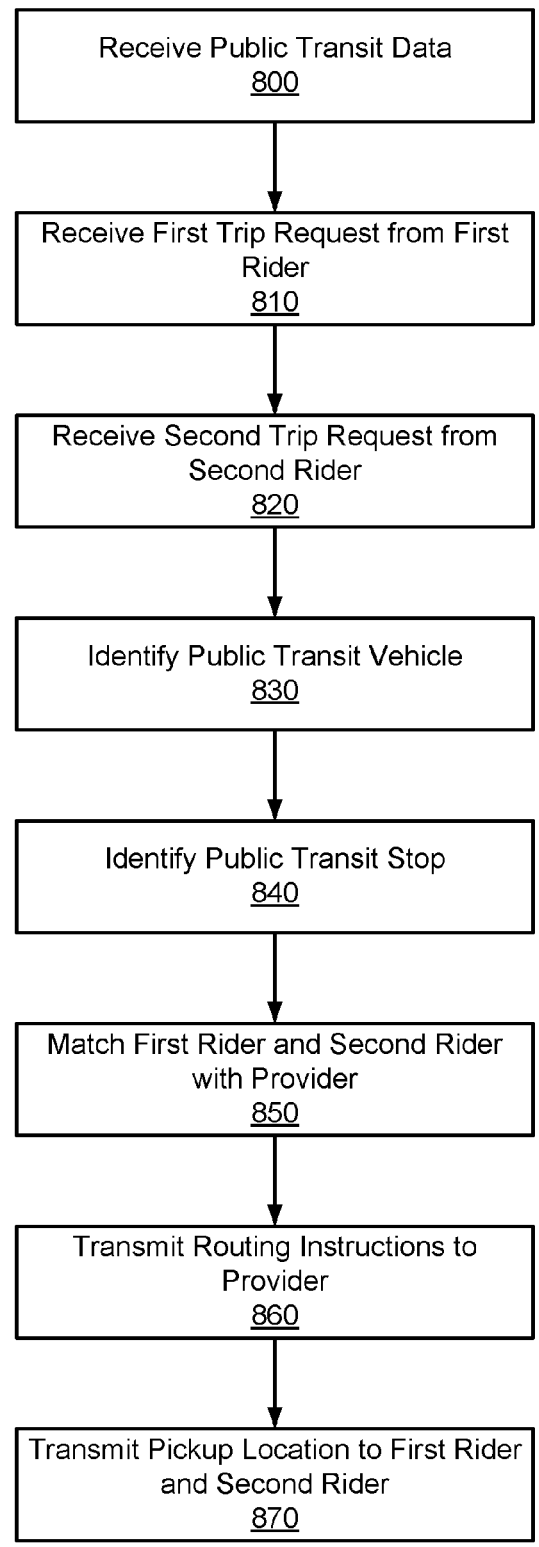
FIG. 8 illustrates a flowchart of a method for matching riders on the same public transit vehicle with one provider, in accordance with some embodiments.

FIG. 8 illustrates a flowchart of a method for matching riders on the same public transit vehicle with one provider, in accordance with some embodiments. Alternate embodiments may include more, fewer, or different steps from those described below, and the steps may be performed in a different order than the order illustrated in FIG. 8. Furthermore, the steps herein may be performed automatically and without human interaction with the travel coordination system.

The travel coordination system receives 800 public transit data from a public transit system. The public transit data can describe one or more public transit vehicles that transport passengers between public transit stops. The travel coordination system may store the public transit data in a directed graph, wherein nodes of the graph are public transit stops and an edge from one node to another node represents a public transit line that transports passengers from a first public transit stop to a second public transit stop.

The travel coordination system receives 810 a first trip request from a first rider and receives 820 a second trip request from a second rider. The first rider and the second rider are both traveling within the public transit system, and the first trip request and the second trip request can each include a current location and a destination of their respective riders. In some embodiments, the trip requests include a public transit line or a public transit vehicle on which the riders are traveling.

The travel coordination system may determine whether the riders are traveling on the same public transit vehicle and, if so, identifies 830 the public transit vehicle on which the first rider and the second rider are traveling. The public transit vehicle may identify the vehicle based on the current location of the first rider, the current location of the second rider, and the public transit data received from the public transit system. For example, the travel coordination system may identify the public transit vehicle based on whether the current locations of the riders are near the location of a public transit vehicle, as described by the public transit data.

The travel coordination system may determine routes for the first rider and the second rider from their current locations to their destinations. The routes can include public transit stops at which the riders exit the public transit system when following their respective routes. If the routes involve the riders exiting the public transit vehicle at the same stop, the travel coordination system identifies 840 a public transit stop at which the first rider and the second rider will exit the identified public transit vehicle. The travel coordination system may match 850 the first rider and the second rider with the same provider to transport the riders to their destinations. The travel coordination system may decide to match the first rider and the second rider with the same provider based on the destinations of the first rider and the second rider. For example, if the destination of the first rider and the destination of the second rider are close to one another, or if one destination is along a route to another destination, the travel coordination system may match the riders with the same provider.

If the riders are matched with the same provider, the travel coordination system transmits 860 routing instructions to the provider to pick up the first rider and the second rider at a pickup location near the public transit stop. The travel coordination system may match the first rider and the second rider with a provider based on an estimated time when the first rider and the second rider will arrive at the public transit stop, and the routing instructions may instruct the provider to arrive at the public transit stop at a time near when the riders will exit the public transit system at the public transit stop.

The travel coordination system transmits 870 the pickup location to the first rider's client device and the second rider's client device. The travel coordination system may also transmit a route for the first rider and the second rider from their location within or near the public transit stop to the pickup location.

While the disclosure herein predominantly describes coordinating pickup of a rider by a provider when the rider arrives at a public transit stop, the principles herein may be applied in other contexts as well. For example, the travel coordination system can coordinate pickup of a rider at the location of an event when the event ends. For example, the travel coordination system may coordinate pickup of a rider after a movie, a play, a sporting event, a meeting, or a party. The travel coordination system may receive event data that describes the location of the event and when the event ends. The travel coordination system may assign a provider to pick up a rider from the event in response to receiving a trip request from the rider, or may do so automatically based on the rider's location and the event data. The travel coordination system may match more than one rider attending the event with the same provider based on the number of riders at the event and the destinations of the riders.

Additionally, the principles herein may be applied to coordinate the travel of a rider from his original location to their destination. For example, the rider may submit a request for transportation from a pickup location to a public transit stop on a public transit line, and to be picked up from a second public transit stop on a public transit line to be transported to his final destination. The travel coordination system may determine which public transit stop the rider should use to enter the public transit system, which public transit stop the rider should use to exit the public transit system, the rider's route through the public transit system, and which providers will provide transportation to the rider from the rider's original pickup location to the public transit system and from the public transit system to the rider's destination.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computer processor coupled to a data storage device storing the computer program can correspond to a special-purpose processor or computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, from a public transit system at a computing system, public transit data corresponding to one or more public transit vehicles that transport passengers between a plurality of public transit stops and a plurality of estimated arrival times of the one or more public transit vehicles at the plurality of public transit stops;

receiving, at the computing system, a first trip request from a first rider client device of a first rider, the first rider traveling on a public transit vehicle of the one or more public transit vehicles, and the first trip request comprising a current location and a destination of the first rider;

receiving, at the computing system, a second trip request from a second rider client device of a second rider, the second rider traveling on the public transit vehicle of the one or more public transit vehicles, and the second trip request comprising a current location and a destination of the second rider;

identifying, by the computing system, the public transit vehicle on which the first rider and the second rider are traveling based on the current location of the first rider, the current location of the second rider, and the public transit data;

identifying, by the computing system, a public transit stop at which the first rider and the second rider will exit the public transit vehicle;

identifying, by the computing system, an estimated arrival time of the plurality of estimated arrival times that corresponds with when the identified public transit vehicle is expected to arrive at the identified public transit stop;

matching, by the computing system, the first rider and the second rider with a provider based on the destination of the first rider, the destination of the second rider, and the identified estimated arrival time;

transmitting, to a provider client device of the provider by the computing system, instructions to pick up the first rider and the second rider at a pickup location near the identified public transit stop at a time near the identified estimated arrival time; and transmitting, by the computing system, the pickup location to the first rider client device and the second rider client device.

2. The method of claim 1, further comprising storing the public transit data in a directed graph.

3. The method of claim 1, wherein identifying the public transit vehicle comprises determining whether the first rider and the second rider are traveling on the public transit vehicle.

4. The method of claim 1, wherein the public transit vehicle is identified based on user travel data.

5. The method of claim 4, wherein the user travel data comprises at least one of location data, acceleration data, or identifiers of wireless networks.

6. The method of claim 4, wherein identifying the public transit vehicle comprises comparing the user travel data to one or more travel data fingerprints.

7. The method of claim 1, wherein identifying the public transit stop comprises determining whether the first user and the second user will exit the public transit system at the public transit stop.

8. The method of claim 7, wherein identifying the public transit stop comprises determining a first route for the first user and a second route for the second user, the first route and the second route each including the public transit stop as a public transit stop at which the first rider and the second rider, respectively, will exit the public transit system.

9. The method of claim 8, wherein determining the first route and the second route comprises:
generating a set of candidate routes from the current location of the first rider to the destination of the first rider and from the current location of the second rider to the destination of the second rider;
generating a set of scores for the set of candidate routes based on routing data; and
selecting the first route and the second route from the set of candidate routes based on the set of scores.

10. The method of claim 7, wherein:
the first trip request includes a first public transit stop at which the first rider will exit the public transit system;
the second trip request includes a second public transit stop at which the second rider will exit the public transit system; and
determining whether the first user and the second user will exit the public transit system at the identified public transit stop comprises determining whether the first public transit stop is the same as the second public transit stop.

11. The method of claim 1, further comprising, responsive to the first rider and the second rider arriving at the public transit stop, transmitting routing instructions to the first rider client device and the second client device that route the first rider and the second rider to the pickup location.

12. A non-transitory, computer-readable medium comprising instructions that, when executed by a processor, cause the processor to:
receive, from a public transit system at a computing system, public transit data corresponding to one or more public transit vehicles that transport passengers between a plurality of public transit stops and a plurality of estimated arrival times of the one or more public transit vehicles at the plurality of public transit stops;
receive, at the computing system, a first trip request from a first rider client device of a first rider, the first rider traveling on a public transit vehicle of the one or more public transit vehicles, and the first trip request comprising a current location and a destination of the first rider;
receive, at the computing system, a second trip request from a second rider client device of a second rider, the second rider traveling on the public transit vehicle of the one or more public transit vehicles, and the second trip request comprising a current location and a destination of the second rider;
identify, by the computing system, the public transit vehicle on which the first rider and the second rider are traveling based on the current location of the first rider, the current location of the second rider, and the public transit data;
identify, by the computing system, a public transit stop at which the first rider and the second rider will exit the public transit vehicle;
identify, by the computing system, an estimated arrival time of the plurality of estimated arrival times that corresponds with when the identified public transit vehicle is expected to arrive at the identified public transit stop;
match, by the computing system, the first rider and the second rider with a provider based on the destination of the first rider, the destination of the second rider, and the identified estimated arrival time;
transmit, to a provider client device of the provider by the computing system, instructions to pick up the first rider and the second rider at a pickup location near the identified public transit stop at a time near the identified estimated arrival time; and
transmit, by the computing system, the pickup location to the first rider client device and the second rider client device.

13. The computer-readable medium of claim 12, further comprising instructions that cause the processor to store the public transit data in a directed graph.

14. The computer-readable medium of claim 12, wherein the instructions for identifying the public transit vehicle comprise instructions that cause the processor to determine whether the first rider and the second rider are traveling on the public transit vehicle.

15. The computer-readable medium of claim 12, wherein the public transit vehicle is identified based on user travel data.

16. The computer-readable medium of claim 15, wherein the instructions for identifying the public transit vehicle comprise instructions that cause the processor to compare the user travel data to one or more travel data fingerprints.

17. The computer-readable medium of claim 12, wherein the instructions for identifying the public transit stop comprise instructions that cause the processor to determine whether the first user and the second user will exit the public transit system at the public transit stop.

18. The computer-readable medium of claim 17, wherein the instructions for identifying the public transit stop comprises instructions that cause the processor to determine a first route for the first user and a second route for the second user, the first route and the second route each including the public transit stop as a public transit stop at which the first rider and the second rider, respectively, will exit the public transit system.

19. The computer-readable medium of claim 18, wherein the instructions for determining the first route and the second route comprise instructions that cause the processor to:
    generate a set of candidate routes from the current location of the first rider to the destination of the first rider and from the current location of the second rider to the destination of the second rider;
    generate a set of scores for the set of candidate routes based on routing data; and
    select the first route and the second route from the set of candidate routes based on the set of scores.

20. The computer-readable medium of claim 17, wherein:
    the first trip request includes a first public transit stop at which the first rider will exit the public transit system;
    the second trip request includes a second public transit stop at which the second rider will exit the public transit system; and
    the instructions for determining whether the first user and the second user will exit the public transit system at the identified public transit stop comprise instructions that cause the processor to determine whether the first public transit stop is the same as the second public transit stop.

* * * * *